United States Patent
Hirakawa

(10) Patent No.: US 8,928,722 B2
(45) Date of Patent: Jan. 6, 2015

(54) OPTICAL SCANNING DEVICE AND IMAGE FORMING APPARATUS COMPRISING THE SAME

(75) Inventor: Hiroyuki Hirakawa, Osaka (JP)

(73) Assignee: Kyocera Mita Corporation, Osaka-shi (JP)

( * ) Notice: Subject to any disclaimer, the term of this patent is extended or adjusted under 35 U.S.C. 154(b) by 336 days.

(21) Appl. No.: 13/010,211

(22) Filed: Jan. 20, 2011

(65) Prior Publication Data
US 2011/0182621 A1 Jul. 28, 2011

(30) Foreign Application Priority Data
Jan. 28, 2010 (JP) ................................. 2010-016506

(51) Int. Cl.
| | | |
|---|---|---|
| B41J 15/14 | (2006.01) | |
| B41J 27/00 | (2006.01) | |
| G03G 15/04 | (2006.01) | |
| G02B 13/00 | (2006.01) | |
| G02B 26/12 | (2006.01) | |
| G03G 15/32 | (2006.01) | |
| B41J 2/47 | (2006.01) | |

(52) U.S. Cl.
CPC ........ *G03G 15/0409* (2013.01); *G02B 13/0005* (2013.01); *G02B 26/121* (2013.01); *G03G 15/326* (2013.01); *B41J 2/471* (2013.01)
USPC ............ 347/261; 347/243; 347/259; 347/260

(58) Field of Classification Search
USPC ................................. 347/243, 259, 260, 261; 359/216.1–221.1
See application file for complete search history.

(56) References Cited

U.S. PATENT DOCUMENTS

| | | | | |
|---|---|---|---|---|
| 5,901,000 | A * | 5/1999 | Fish et al. ...................... | 359/896 |
| 6,680,789 | B2 * | 1/2004 | Hosonuma ................. | 359/216.1 |
| 6,903,858 | B2 * | 6/2005 | Kaneko et al. ............. | 359/216.1 |
| 7,038,825 | B2 * | 5/2006 | Matsui et al. .............. | 359/200.5 |
| 8,144,180 | B2 * | 3/2012 | Uduki ........................... | 347/261 |
| 8,169,458 | B2 * | 5/2012 | Itami et al. ................... | 347/243 |
| 8,199,391 | B2 * | 6/2012 | Nagase ...................... | 359/216.1 |
| 8,199,392 | B2 * | 6/2012 | Fukushima et al. ....... | 359/216.1 |
| 8,593,497 | B2 * | 11/2013 | Amada et al. ................ | 347/241 |
| 2001/0001251 | A1 * | 5/2001 | Tachibe et al. ............... | 359/819 |

FOREIGN PATENT DOCUMENTS

| | | |
|---|---|---|
| JP | 2000-267037 | 9/2000 |
| JP | 200461746 | 2/2004 |
| JP | 2004354847 | 12/2004 |
| JP | 2008168472 | 7/2008 |

* cited by examiner

*Primary Examiner* — Uyen Chau N Le
*Assistant Examiner* — John M Bedtelyon
(74) *Attorney, Agent, or Firm* — Gerald E. Hespos; Michael J. Porco; Matthew T. Hespos

(57) ABSTRACT

An optical scanning device includes a housing, a laser light source outputting a laser light, a polygon mirror arranged in an arrangement space and deflecting the laser light to scan a predetermined object with the laser light while rotating, a polygon motor rotating the polygon mirror, a control board arranged in the arrangement space and controlling the polygon motor, and a flow-control member arranged in the arrangement space and guiding an airflow generated by a rotation of the polygon mirror to an outside of the arrangement space to circulate the airflow within the housing.

15 Claims, 13 Drawing Sheets

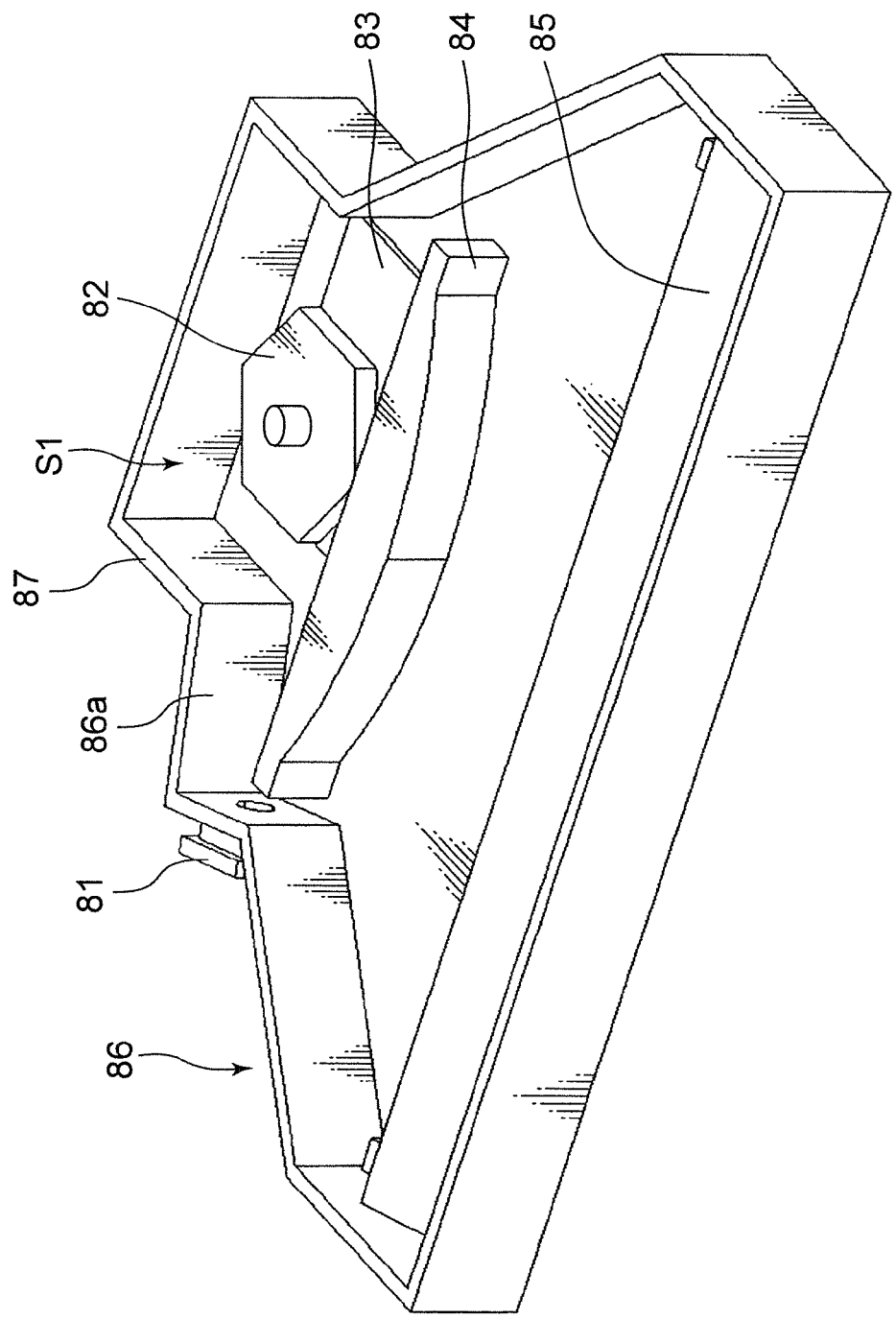

OPTICAL SCANNING DEVICE AND IMAGE FORMING APPARATUS COMPRISING THE SAME

BACKGROUND OF THE INVENTION

1. Field of the Invention

The present invention relates to an optical scanning device that scans a predetermined object with a laser light and an image forming apparatus including the optical scanning device.

2. Description of the Related Art

An optical scanning device that outputs a laser light and scans a predetermined object with the laser light is used as an exposure device in an image forming apparatus such as a copier, a printer, and a fax machine. An exposure device scans a photosensitive drum with a laser light based on image information from the outside and forms an electrostatic latent image on the photosensitive drum.

As illustrated in FIG. 13, the exposure device includes, as basic components, a laser light source 81 that outputs a laser light, a polygon mirror 82 that deflects the laser light and scans a photosensitive drum with the laser light, a polygon motor (not shown) that rotates the polygon mirror 82, a control board 83 that controls the polygon motor, an fθ lens 84 and a reflective mirror 85 that guide the laser light deflected by the polygon mirror 82 to the photosensitive drum, and a housing 86 that houses the aforementioned optical system elements.

Recent image forming apparatuses demand faster development operations. Achieving such an objective requires rotating the polygon mirror 82 of the exposure device at high speed. Therefore, a temperature of the control board 83 that controls the polygon motor tends to rise.

In addition, in keeping with recent demands for smaller image forming apparatuses, exposure devices must also be downsized. While the polygon mirror 82 and the control board 83 are arranged in an arrangement space S1 defined by an inner wall surface 86a that is a part of a wall part 87 of the housing 86, the arrangement space S1 must be minimized in order to meet the needs for downsizing. In other words, a distance between the polygon mirror 82 and the wall part 87 must be minimized. Furthermore, in order to fulfill the need for downsizing, optical system elements such as the polygon mirror 82 and the fθ lens 84 are arranged as close to each other as possible.

Therefore, heat generated at the control board 83 is more likely to be retained in the arrangement space S1 to cause a rise in the temperature of the arrangement space S1, while temperatures of spaces in the housing 86 other than the arrangement space S1 drop in comparison. Although an airflow is generated by a rotation of the polygon mirror 82, the airflow is blocked by the inner wall surface 86a that defines the arrangement space S1 or by the fθ lens 84 and is retained in the arrangement space S1, thereby preventing heat generated at the control board 83 from being guided to the outside of the arrangement space S1.

As described above, since an uneven temperature distribution occurs inside the housing 86, there is a risk of a nonuniform thermal deformation occurring between a high temperature area and a low temperature area of the housing 86. A nonuniform thermal deformation of the housing 86 causes displacement of arrangement positions of optical system elements and displacement of relative positions among the optical system elements. For example, if the fθ lens 84 is displaced from a predetermined arrangement position at both longitudinal ends, a laser scan line may become bent or a so-called left-right magnification difference may occur. As a result, it becomes difficult to form a favorable toner image on the photosensitive drum.

A first prior art is known as an example of a technique for suppressing a nonuniform thermal deformation of a housing. An optical scanning device according to the first prior art includes a housing comprising an outer wall, an inner wall, a bottom wall, and an upper cover, wherein a flow channel defined by the outer wall, the inner wall, the bottom wall, and the upper cover is formed on a outer circumferential side of the housing. In addition, a polygon mirror and a drive unit thereof are arranged inside the flow channel.

With the optical scanning device according to the first prior art, since an airflow generated by a rotation of the polygon mirror endlessly circulates inside the flow channel along an outer circumference of the housing, heat generated by the drive unit is not retained in one spot and is instead carried by the airflow to be cooled within the flow channel. Accordingly, the generation of an uneven temperature distribution in the housing and, in turn, the occurrence of a nonuniform thermal deformation of the housing is suppressed.

However, with the optical scanning device according to the first prior art, since the flow channel is provided on the outer circumferential side of the housing, a size of the housing increases by just that much. As a result, recent demands for smaller image forming apparatuses cannot be fulfilled.

SUMMARY OF THE INVENTION

In consideration of the circumstances described above, it is an object of the present invention to provide an optical scanning device capable of suppressing a nonuniform thermal deformation of a housing without increasing housing size, and an image forming apparatus comprising the optical scanning device.

In order to achieve the aforementioned object, an optical scanning device according to one aspect of the present invention includes a housing having a wall part and an arrangement space defined by a first inner wall surface in a part of the wall part, a laser light source outputting a laser light, a polygon mirror arranged in the arrangement space and deflecting the laser light to scan a predetermined object with the laser light while rotating, a polygon motor rotating the polygon mirror, a control board controlling the polygon motor, and a flow-control member arranged in the arrangement space and guiding an airflow generated by a rotation of the polygon mirror to an outside of the arrangement space to circulate the airflow within the housing.

BRIEF DESCRIPTION OF THE DRAWINGS

FIG. 13 is a perspective view of a conventional exposure device.

DETAILED DESCRIPTION OF THE PREFERRED EMBODIMENTS

Embodiments of the present invention will now be described in detail with reference to the drawings.

Figure 1:
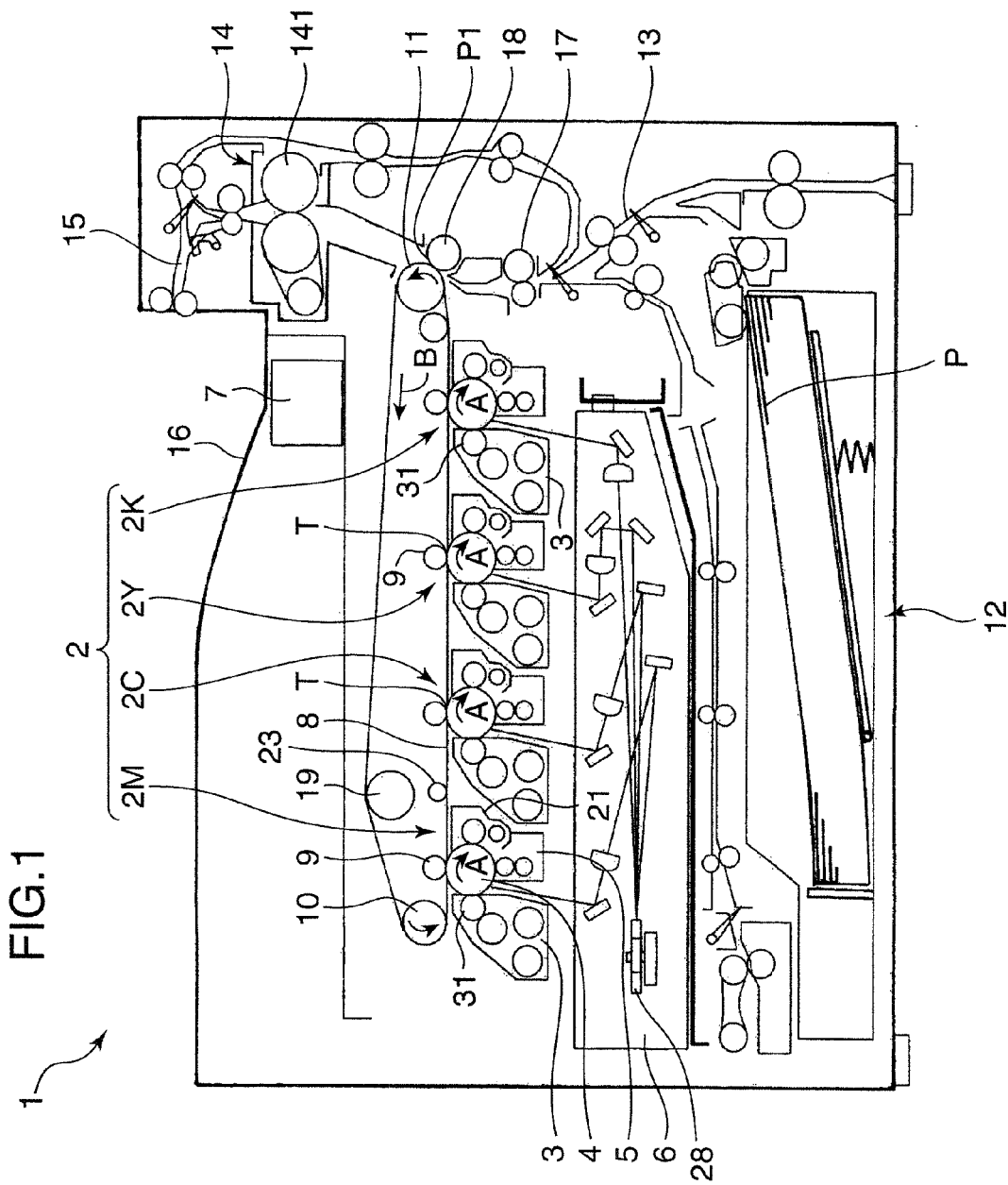
FIG. 1 is a diagram schematically illustrating an internal configuration of an image forming apparatus to which an optical scanning device (exposure device) according to an embodiment of the present invention has been applied.

FIG. 1 is a diagram schematically illustrating an internal configuration of an image forming apparatus to which an optical scanning device according to an embodiment of the present invention has been applied. An image forming apparatus 1 is, for example, a printer. As illustrated in FIG. 1, the image forming apparatus 1 is a tandem color printer including image forming units 2 (2M, 2C, 2Y, and 2K) of different colors of magenta (M), cyan (C), yellow (Y), and black (K). Each of the image forming units 2M, 2C, 2Y, and 2K includes a developing device 3, a charger 5, an exposure device 6, a toner supplying unit 7, a cleaner 21, and a primary transfer roller 9.

The toner supplying unit 7 stores respective color toners of magenta, cyan, yellow, and black. The developing device 3 includes a developing roller 31 for supplying toner supplied from the toner supplying unit 7 to the photosensitive drum 4.

The developing roller 31 includes a cylindrical developing sleeve whose surface is made of, for example, a nonmagnetic material such as aluminium. A magnet material and the like are arranged inside the developing sleeve. A developer made up of the toner in the developing device 3 and a carrier is absorbed onto a surface of the developing roller 31 by a magnetic force of the magnet material, and due to a rotation of the developing roller 31 in a predetermined direction, only the toner among the developer is transferred onto the surface of the photosensitive drum 4.

The photosensitive drum 4 is positioned below a transfer belt 8, to be described later, and is arranged in a state where the photosensitive drum 4 is in contact with an outer surface of the transfer belt 8. A magenta photosensitive drum 4, a cyan photosensitive drum 4, a yellow photosensitive drum 4, and a black photosensitive drum 4 are arranged adjacent to each other in this order from an upstream side in a rotational direction B of the transfer belt 8. In addition, the photosensitive drum 4 is made of a-Si (amorphous silicon) or the like and rotates in a clockwise direction as seen in FIG. 1 (a direction A in the diagram).

The primary transfer roller 9 is arranged via the transfer belt 8 at a position opposing the photosensitive drum 4 in a state where the primary transfer roller 9 is in contact with an inner surface of the transfer belt 8. The primary transfer roller 9 is a roller that is rotationally driven by a rotation of the transfer belt 8, and constitutes a primary transferring unit T that nips the transfer belt 8 with the photosensitive drum 4 and causes primary transfer of respective color toner images formed on the photosensitive drum 4 to the transfer belt 8. At the primary transferring unit T, a multi-layer transfer of the respective color toner images is performed on the transfer belt 8. Accordingly, a color toner image is formed on the transfer belt 8.

The charger 5 uniformly charges a circumferential surface of the photosensitive drum 4. The exposure device (optical scanning device) 6 has a polygon mirror 28 that guides a laser light based on original image data inputted from an external PC (personal computer) and the like to the circumferential surface of the photosensitive drum 4. While being rotated by a polygon motor 29 (FIG. 2), the polygon mirror 28 scans the circumferential surface of each photosensitive drum 4 by the laser light in a main scanning direction and forms an electrostatic latent image on each circumferential surface. In this case, the main scanning direction refers to a direction in which the laser light scans in a longitudinal direction of the photosensitive drum 4. In FIG. 1, the polygon mirror 28 is shared by a plurality of photosensitive drums 4.

The developing device 3 supplies a toner to the photosensitive drum 4. Accordingly, the toner attaches to an electrostatic latent image and a toner image is formed on the photosensitive drum 4.

The cleaner 21 is arranged on the circumferential surface of each photosensitive drum 4 and removes residual toner or the like on the circumferential surface.

The transfer belt 8 is a belt including an elastic layer made of, for example, CR (chloroprene) rubber, and is arranged above the row of photosensitive drums 4 and, at the same time, installed so as to be stretched between the driven roller 10 and the driving roller 11 such that an external surface of the transfer belt 8 is in contact with the circumferential surfaces of the photosensitive drums 4. In addition, the transfer belt 8 is biased upward by a tension roller 19. The driving roller 11 rotates by receiving a driving force from a drive source, not shown, and rotationally drives the transfer belt 8. The driven roller 10 is rotationally driven by the rotation of the transfer belt 8. Consequently, the transfer belt 8 rotates in a direction B (counter-clockwise).

Furthermore, a portion of the transfer belt 8 wound around the driving roller 11 is in a bent state, in which case the bent portion is set as a secondary transfer position P1 at which a toner image primary-transferred to the transfer belt 8 is secondary-transferred onto a paper P. A secondary transfer roller 18 that opposes the driving roller 11 via the transfer belt 8 is provided at the secondary transfer position P1. The secondary transfer roller 18 forms a nip with the driving roller 11 and performs a secondary transfer of a toner image on an external surface of the transfer belt 8 onto a paper P passing through the nip.

A pair of resist rollers 17 is arranged below the secondary transfer position P1. The resist rollers 17 convey a paper P toward the secondary transfer position P1 at an appropriate timing and, at the same time, correct any skew feed of the paper P.

A fixing device 14 that applies a fixing process to the paper P, to which a toner image has been secondary-transferred at the secondary transfer position P1, is provided above the secondary transfer position P1. The fixing device 14 includes a pair of fixing rollers 141, and fixes a secondary-transferred toner image onto the paper P by pressurizing the paper P and nipping the paper P between the fixing rollers 141.

A paper cassette 12 that stores a stack of paper is arranged at a position below the exposure device 6. A paper conveying path 13 that guides the paper P from the paper cassette 12 to the secondary transfer position P1 is provided between the paper cassette 12 and the secondary transfer position P1. The aforementioned resist rollers 17 are arranged on the paper conveying path 13. Furthermore, in addition to the resist rollers 17, a plurality of roller pairs for guiding the paper P is installed at appropriate positions along the paper conveying path 13.

A discharge unit 16 that discharges a paper P subjected to a fixing process by the fixing device 14 is formed on an upper face of the printer 1, and a paper discharge path 15 for guiding the paper P is provided between the discharge unit 16 and the fixing device 14. Roller pairs for guiding the paper P are also installed at appropriate positions along the paper discharge path 15.

Figure 2:
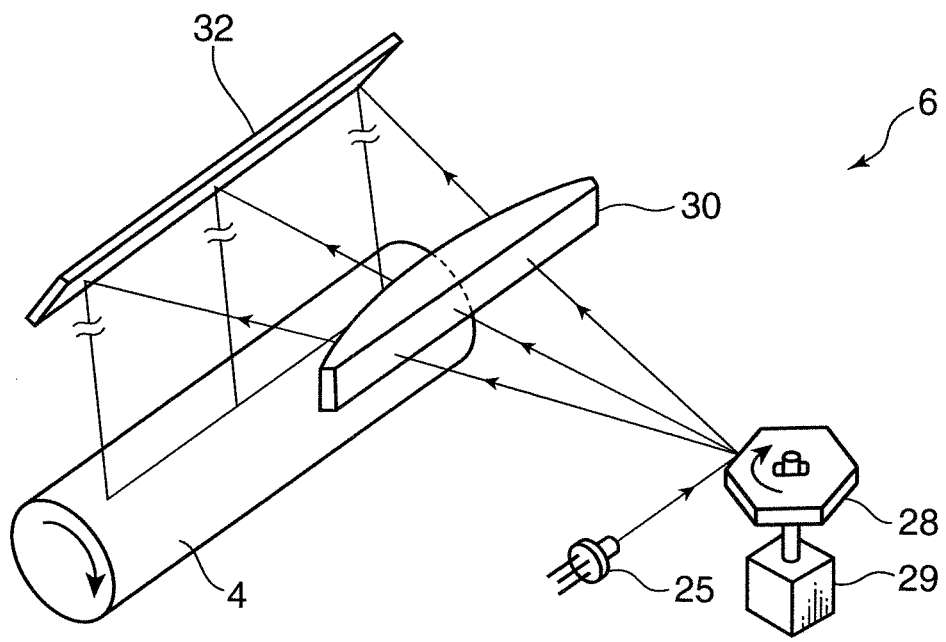
FIG. 2 is an explanatory diagram schematically illustrating primary components of an exposure device.

Hereinafter, an exposure device will be described with reference to FIG. 2. FIG. 2 is an explanatory diagram schematically illustrating primary components of an exposure device. The exposure device 6 includes a laser light source 25, the polygon mirror 28, the polygon motor 29, an fθ lens 30, and a reflective mirror 32.

The laser light source 25 is constituted using a semiconductor laser oscillator such as a diode laser. The laser light source 25 outputs, along a predetermined optical axis, a laser light whose intensity has been adjusted according to a control analog voltage outputted from a control unit, not shown. A cylindrical lens or a collimated lens for adjusting a beam diameter of the laser light may be arranged on the optical axis of the laser light.

The polygon mirror 28 is rotated by the polygon motor 29 at a predetermined speed and deflects the laser light outputted from the laser light source 25 so that the laser light scans in a longitudinal direction of the photosensitive drum 4 (in other words, the main scanning direction). In FIG. 2, since the polygon mirror 28 rotates clockwise, the laser light scans from the left-hand side to the right-hand side of the photosensitive drum 4. In addition, the polygon mirror 28 is controlled by a control board 33 (FIG. 3).

The fθ lens 30 is arranged on a downstream-side of the polygon mirror 28 in a direction in which the laser light travels, and guides the laser light to the reflective mirror 32 so that the laser light scans at a constant speed in a main scanning direction of the photosensitive drum 4. The reflective mirror 32 is arranged on a downstream-side of the fθ lens 30 with respect to the direction in which the laser light travels, and reflects and guides the laser light outputted from the fθ lens 30 to the photosensitive drum 4. As is apparent from the description of the respective components of the exposure device 6, the exposure device 6 functions as an optical scanning device.

Figure 3:
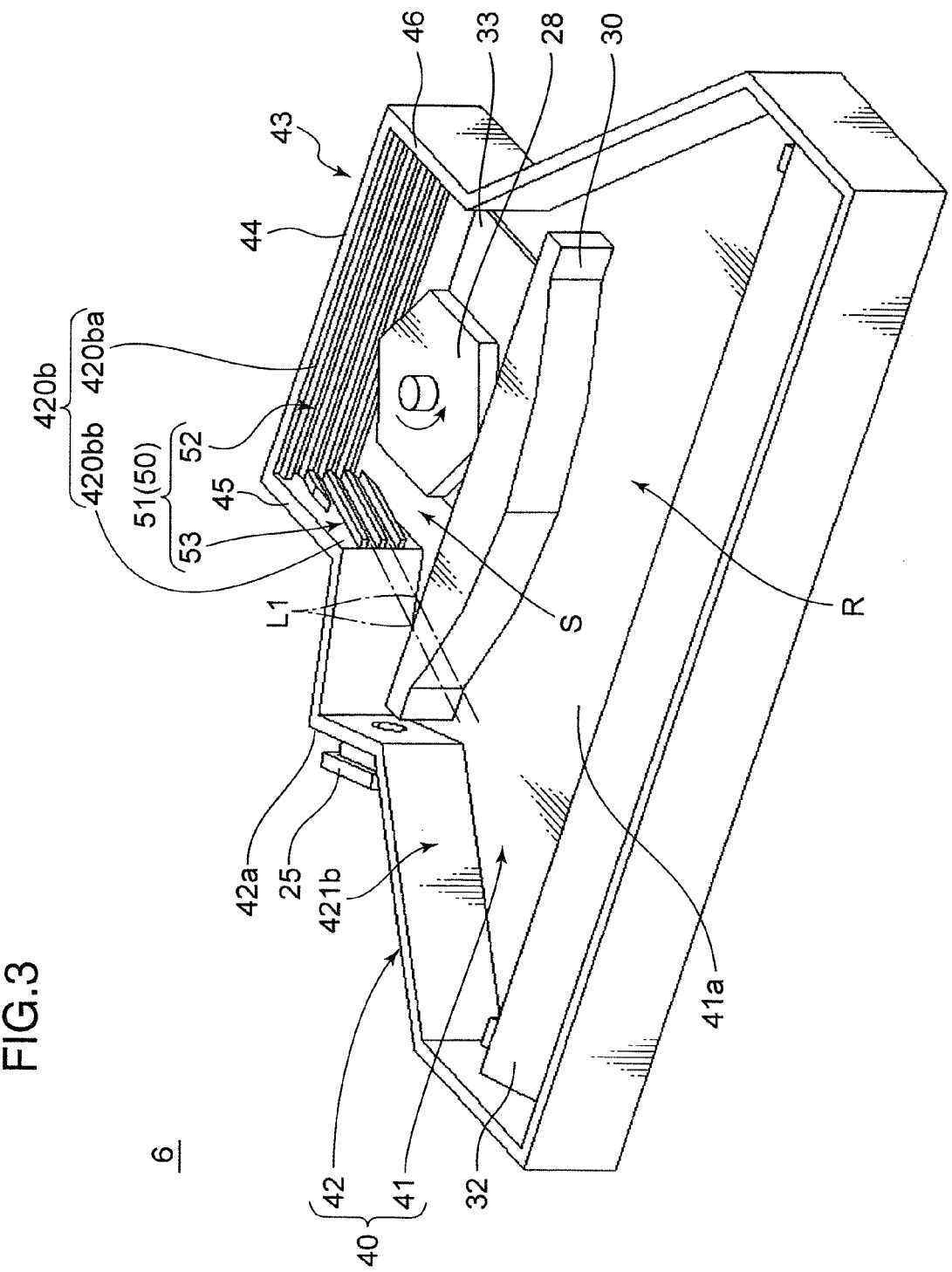
FIG. 3 is a perspective view of an exposure device as seen from obliquely above.

The aforementioned primary components of the exposure device 6 are actually assembled as illustrated in FIG. 3. FIG. 3 is a perspective view of the exposure device 6 as seen from obliquely above. In addition to the primary components described above, the exposure device 6 also includes a housing 40. The housing 40 includes a tabular bottom wall 41, a side wall 42 that rises from a circumferential edge of the bottom wall 41, and a tabular cover member 43 (FIG. 7) which extends parallel to the bottom wall 41 and which is attached to an upper edge of the side wall 42. The polygon mirror 28, the fθ lens 30, and the reflective mirror 32 are housed inside a housing space defined by the bottom wall 41, the side wall 42, and a cover member 43. The polygon mirror 28, the fθ lens 30, and the reflective mirror 32 are fixed to the bottom wall 41 in a positional relationship that maintains a predetermined travel direction of the laser light described earlier with reference to FIG. 2. In addition, the laser light source 25 is mounted on an outer wall surface 42a of the side wall 42 at a position that enables the laser light to be outputted towards the polygon mirror 28.

Furthermore, the control board 33 that controls the polygon motor 29 is fixed to the bottom wall 41. The control board 33 is positioned directly beneath the polygon mirror 28 and arranged in a state where a rotary shaft of the polygon motor 29 penetrates the control board 33. Moreover, in FIG. 3, the polygon mirror 28 is rotated counter-clockwise as indicated by the arrow.

Meanwhile in keeping with recent demands for a smaller size for the printer 1, the exposure device 6 must also be downsized. While the shape of the housing 40 is set to a shape capable of housing the polygon mirror 28, the fθ lens 30, and the reflective mirror 32, in order to meet the demands for downsizing, distances between the optical system elements and the side wall 42 of the housing 40 and distances among the optical system elements are reduced as much as possible without interfering with the travel of the laser light.

In particular, while an arrangement space S in which the polygon mirror 28 and the control board 33 are arranged is a space defined by a first inner wall surface 420b that is a part of the side wall 42 and an inner wall surface 41a that is a part of the bottom wall 41, a spatial capacity of the arrangement space S is set as small as possible in order to meet the demands for downsizing. Specifically, as illustrated in FIG. 3, the arrangement space S is defined by the inner wall surface 41a that is a part of the bottom wall 41 and the first inner wall surface 420b that is an inner wall surface of a portion formed in an approximately U-shape as seen from above (hereinafter referred to as a U-shaped part 43) among the side wall 42, and a distance between the polygon mirror 28 and the first inner wall surface 420b is set small. In addition, the fθ lens 30 is arranged as close as possible to the polygon mirror 28. An opening-side of the U-shaped part 43 is substantially blocked by the fθ lens 30.

Figure 7:
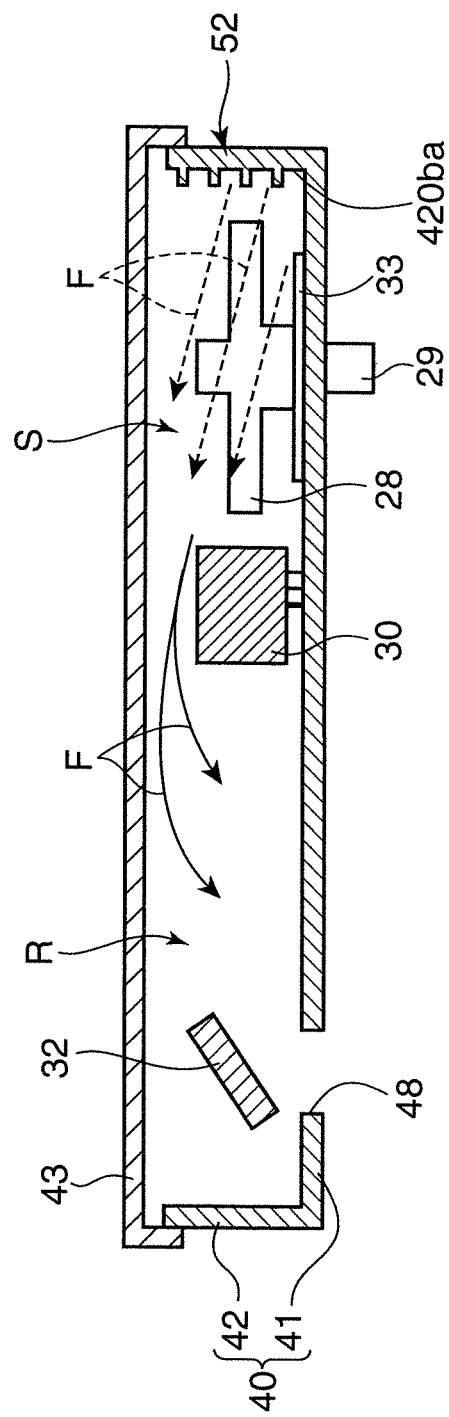
FIG. 7 is a cross-sectional view taken along line X-X in FIG. 6 and illustrates a flow direction of airflow.

The housing 40 further has an opposing space R that opposes the arrangement space S inside the housing 40. The opposing space R is defined by a second inner wall surface 421b that is another part of the side wall 42 and an inner wall surface 41a that is another part of the bottom wall 41. The fθ lens 30 and the reflective mirror 32 are arranged inside the opposing space R. The fθ lens 30 is an elongated optical element that extends in a predetermined direction in the housing 40 and is arranged so as to approximately partition the opposing space R from the arrangement space S. A gap of a predetermined size is formed between both longitudinal ends of the fθ lens 30 and the second inner wall surface 421b, and as illustrated in FIG. 7 to be described later, a gap that communicates the opposing space R with the arrangement space S is formed above the fθ lens 30. While a distance between the fθ lens 30 and the reflective mirror 32 is set as small as possible, a space between the fθ lens 30 and the reflective mirror 32 (in other words, the opposing space R) is set larger than the arrangement space S so as to secure a scanning angle of the laser light.

In the present embodiment, flow-control members 50 and 60 are additionally adopted in the exposure device 6 that is subjected to constraints regarding the arrangement setting of the optical system elements as described above due to demands for downsizing. The flow-control members 50 and 60 are arranged inside the arrangement space S and are adapted to be capable of guiding an airflow generated by a rotation of the polygon mirror 28 to the outside of the arrangement space S and circulating the airflow within the aforementioned housing space of the housing 40. The flow-control members 50 and 60 have groove parts 51 and 61 which enable airflow distribution and which are set so as to extend in a direction that capable of guiding an airflow to the outside of the arrangement space S. Hereinafter, the flow-control member 50 according to a first embodiment and the flow-control member 60 according to a second embodiment will be described.

First Embodiment

Figure 4:
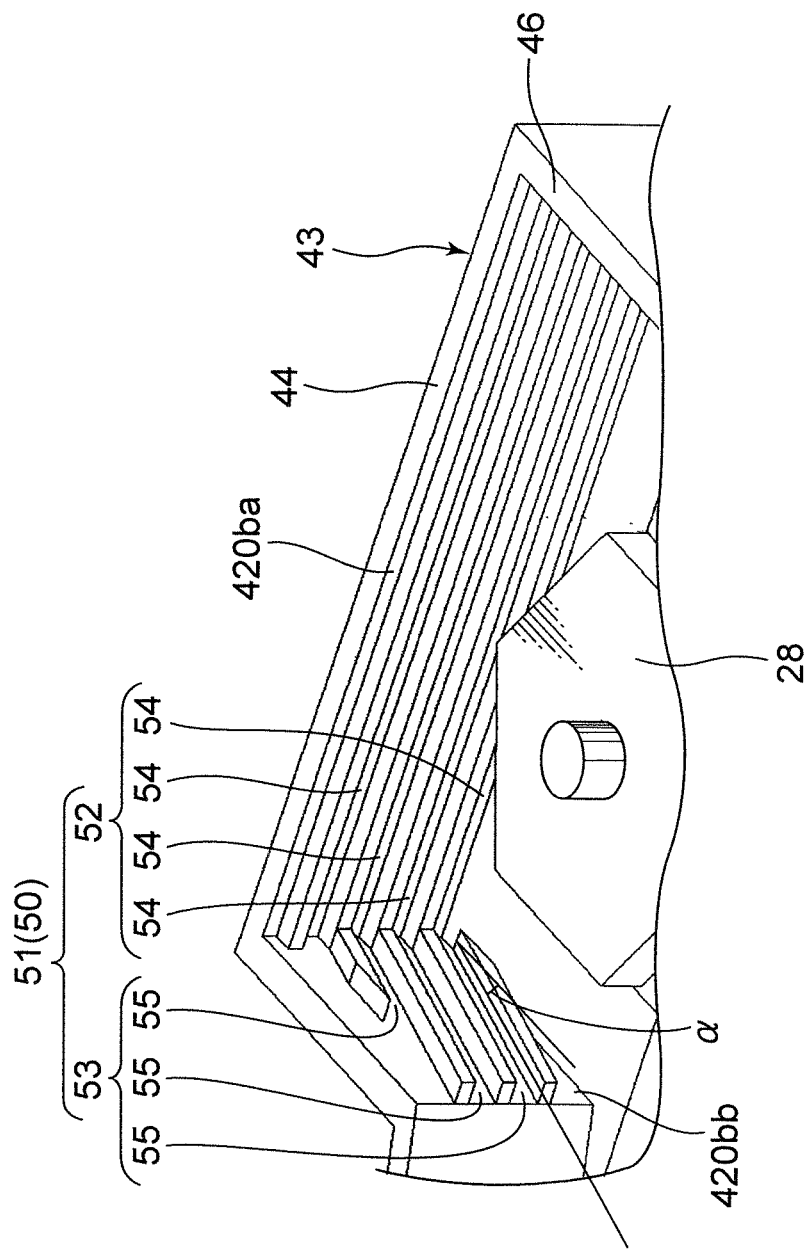
FIG. 4 is an enlarged perspective view of a flow-control member of an exposure device.

FIG. 4 is an enlarged perspective view of the flow-control member 50 according to the first embodiment. In the first embodiment, the groove part 51 of the flow-control member 50 is integrally formed with the U-shaped part 43 of the side wall 42. Specifically, the U-shaped part 43 has a longitudinal portion 44, and a first opposing portion 45 and a second opposing portion 46 which oppose each other across the polygon mirror 28. The longitudinal portion 44 is a wall portion which opposes the fθ lens 30 and the opposing space R across the polygon mirror 28 and which extends approximately parallel to the longitudinal direction of the fθ lens 30. The first opposing portion 45 is a wall portion which is coupled to one longitudinal end of the longitudinal portion 44 and which extends from a side of the longitudinal portion 44 toward the opposing space R. On the other hand, the second opposing portion 46 is a wall portion coupled to the other longitudinal end of the longitudinal portion 44. When seen from a rotational direction of the polygon mirror 28, the first opposing portion 45 is positioned on a downstream-side than the longitudinal portion 44.

The first inner wall surface 420b that is an inner wall surface of the U-shaped part 43 includes a first wall surface 420ba that forms an inner wall surface of the longitudinal portion 44 and a second wall surface 420bb that forms an inner wall surface of the first opposing portion 45. Therefore, the first wall surface 420ba is a wall surface which opposes the opposing space R across the polygon mirror 28 and which extends approximately parallel to the longitudinal direction of the fθ lens 30. In addition, the second wall surface 420bb is a wall surface that extends from the side of the first wall surface 420ba toward the opposing space R.

The groove part 51 of the flow-control member 50 extends across the first wall surface 420ba of the longitudinal portion 44 and the second wall surface 420bb of the first opposing portion 45, and is integrally formed with the first wall surface 420ba of the longitudinal portion 44 and the second wall surface 420bb of the first opposing portion 45. The groove part 51 has a upstream-side portion 52 (first groove part) formed on the first wall surface 420ba of the longitudinal portion 44, and a downstream-side portion 53 (second groove part) formed on the second wall surface 420bb of the first opposing portion 45. The upstream-side portion 52 includes a plurality of grooves 54 parallel to each other and extending approximately in a horizontal direction toward both longitudinal ends of the longitudinal portion 44 (in other words, toward the second wall surface 420bb). The downstream-side portion 53 includes a plurality of grooves 55 parallel to each other and extending at a predetermined angle α (FIG. 4) with respect to a horizontal plane. Each of the grooves 55 is formed on the second wall surface 420bb so as to extend toward the opposing space R. A direction in which the respective grooves 55 of the downstream-side portion 53 extend is set such that the fθ lens 30 is not positioned on a virtual extended line L1 defined by extending the grooves 55. In other words, the predetermined angle α of the respective grooves 55 is set at an angle where the virtual extended line L1 (FIG. 3) and the fθ lens 30 do not intersect each other. In FIG. 4, the grooves 55 of the downstream-side portion 53 are inclined obliquely upward from the side of the longitudinal portion 44 toward the side of the fθ lens 30. The grooves 54 of the upstream-side portion 52 and the grooves 55 of the downstream-side portion 53 communicate with each other.

Figure 5:
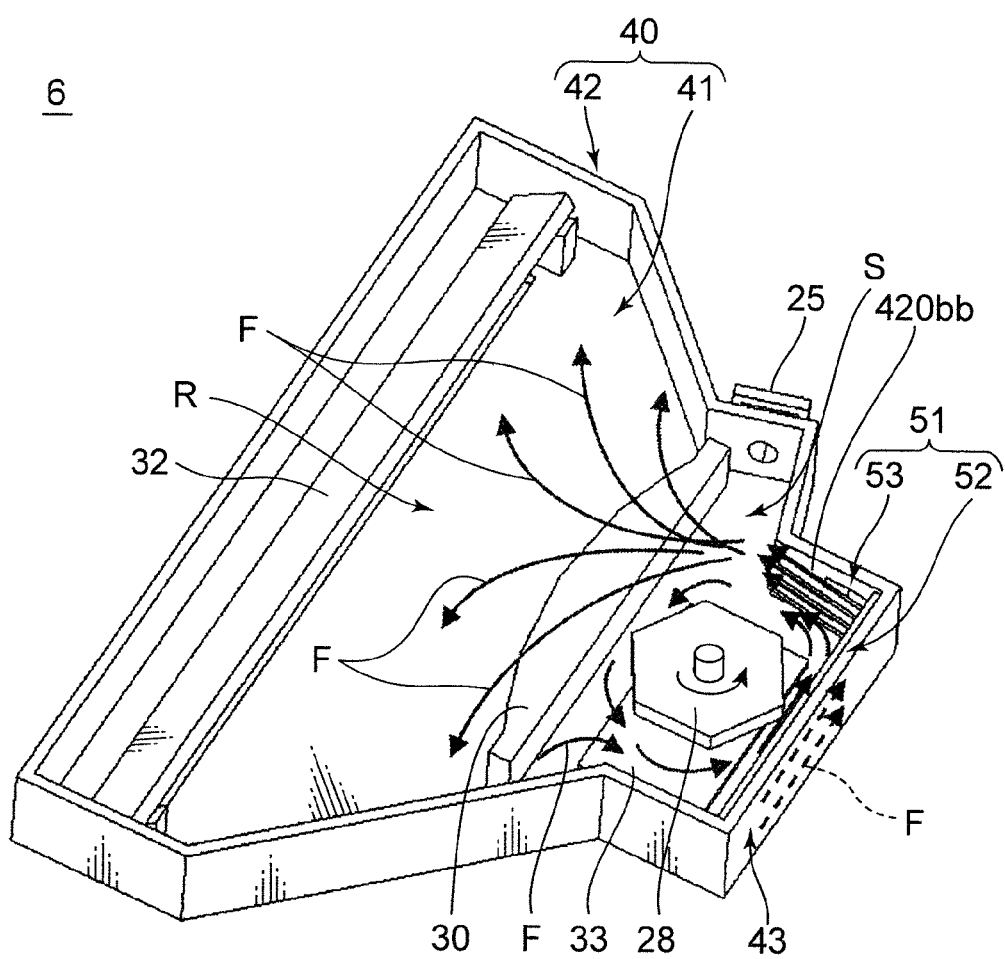
FIG. 5 is a perspective view of an exposure device illustrating a flow direction of airflow.
Figure 6:
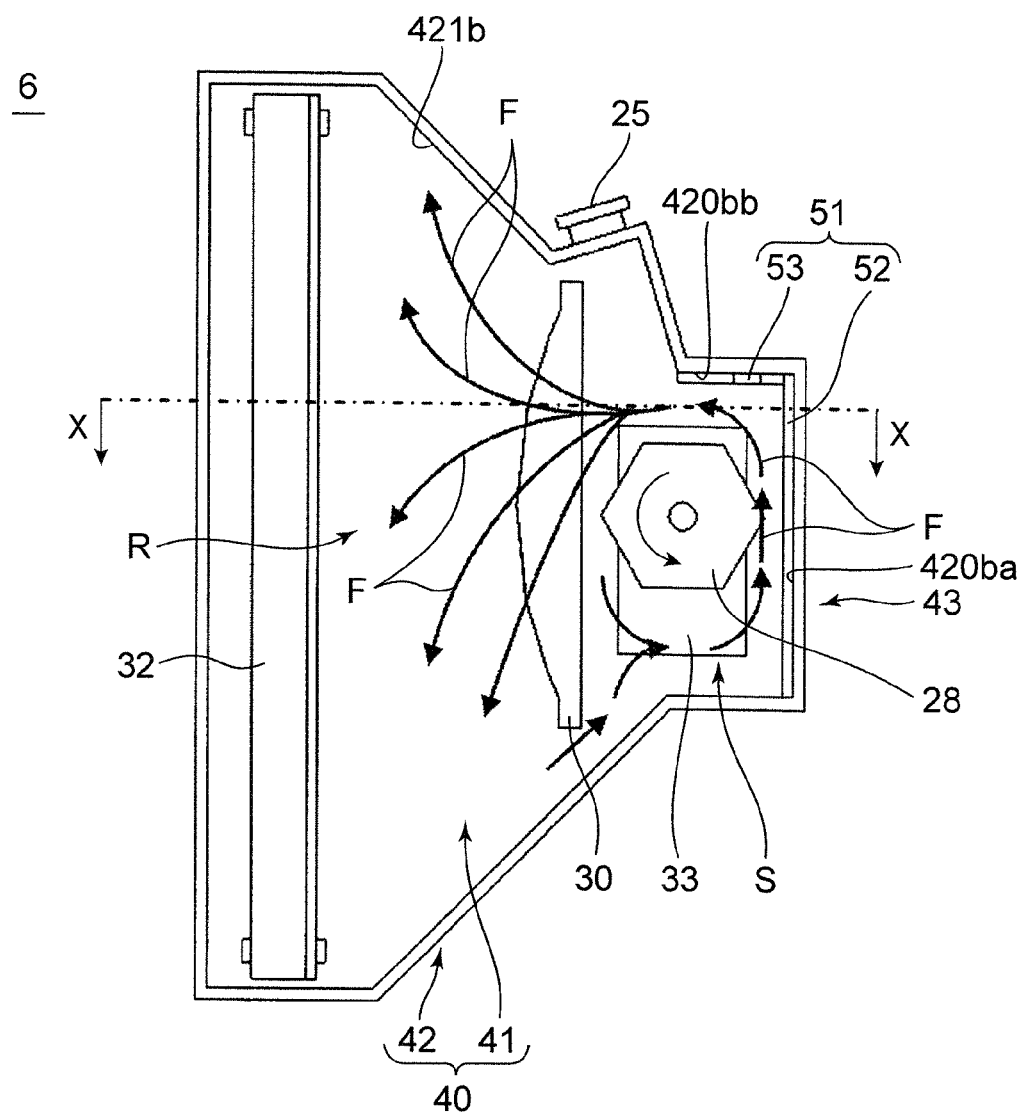
FIG. 6 is a plan view of an exposure device illustrating a flow direction of airflow.

A flow direction of an airflow F generated by a rotation of the polygon mirror 28 is controlled by the flow-control member 50 as indicated by the arrows in FIG. 5 to FIG. 7. FIG. 5 illustrates a flow direction of the airflow F when the exposure device 6 is seen from obliquely above, FIG. 6 illustrates a flow direction of the airflow F when the exposure device 6 is seen from above, and FIG. 7 illustrates a flow direction of the airflow F when the exposure device 6 is seen along line X-X in FIG. 6.

The airflow F generated by a rotation of the polygon mirror 28 first passes through the grooves 54 of the upstream-side portion 52 to be guided to the grooves 55 of the downstream-side portion 53. The flow direction of the airflow F is then deflected from an approximately horizontal direction to an obliquely upward direction by the grooves 55 of the inclined downstream-side portion 53. The airflow F deflected in this manner is guided from the arrangement space S to the opposing space R without being blocked by the first inner wall surface 420b of the U-shaped part 43 or by the fθ lens 30, passes above the fθ lens 30, and is circulated within the opposing space R in the housing 40. Circulation of the airflow F in the opposing space R causes the arrangement space S to enter a negative pressure state. Therefore, a part of the circulated airflow F is suctioned by, and returns into, the arrangement space S. As shown, due to the flow-control member 50, the airflow F can be circulated between the arrangement space S and the opposing space R. Reference numeral 48 in FIG. 7 denotes an opening formed on the bottom wall 41. The laser light reflected by the reflective mirror 32 passes through the opening 48 to be guided to the photosensitive drum 4.

According to the flow-control member 50 of the first embodiment described above, since the airflow F generated by a rotation of the polygon mirror 28 can be guided to the outside of the arrangement space S and circulated within the housing 40, heat generated by the control board 33 is carried to the outside of the arrangement space S and cooled by the airflow F without being retained in the arrangement space S. Therefore, an uneven temperature distribution can be suppressed from occurring in the housing 40. Specifically, a situation where the aforementioned heat is retained in the arrangement space S and raises the temperature of the arrangement space S and, at the same time, a temperature of the opposing space R becomes relatively low can be suppressed. Therefore, a nonuniform thermal deformation of the housing 40 between a high temperature area and a low temperature area can be suppressed. Accordingly, a disadvantage such as bending of a laser scan line or a so-called left-right magnification difference that occurs due to a displacement of arrangement positions of optical system elements (for example, the fθ lens 30) or a displacement of relative positions among the optical system elements (for example, between the fθ lens 30 and the reflective mirror 32) is suppressed. As a result, a favorable toner image can be formed on the photosensitive drum 4.

In addition, since the flow-control member 50 of the first embodiment is arranged in the arrangement space S in which the polygon mirror 28 and the control board 33 are arranged, a space for arranging the flow-control member 50 need not be separately secured in the housing 40. Consequently, a contribution can be made to the downsizing of the housing 40 and, in turn, to the downsizing of the optical scanning device.

Furthermore, since the groove part 51 of the flow-control member 50 is integrally formed with the housing 40, a contribution may readily be made to the downsizing of the optical scanning device.

Moreover, since the direction in which the downstream-side portion 53 of the groove part 51 extends is set such that the fθ lens 30 is not positioned on a virtual extension line L1 defined by extending the downstream-side portion 53, an airflow F deflected by the downstream-side portion 53 is guided from the arrangement space S to the opposing space R without being blocked by the fθ lens 30. Consequently, in addition to suppressing the stay of the airflow F in the arrangement space S due to blocking of the airflow F by the fθ lens 30, deterioration of an optical characteristic of the fθ lens 30 due to heat generated by the control board 33 can also be suppressed.

Second Embodiment

Figure 8:
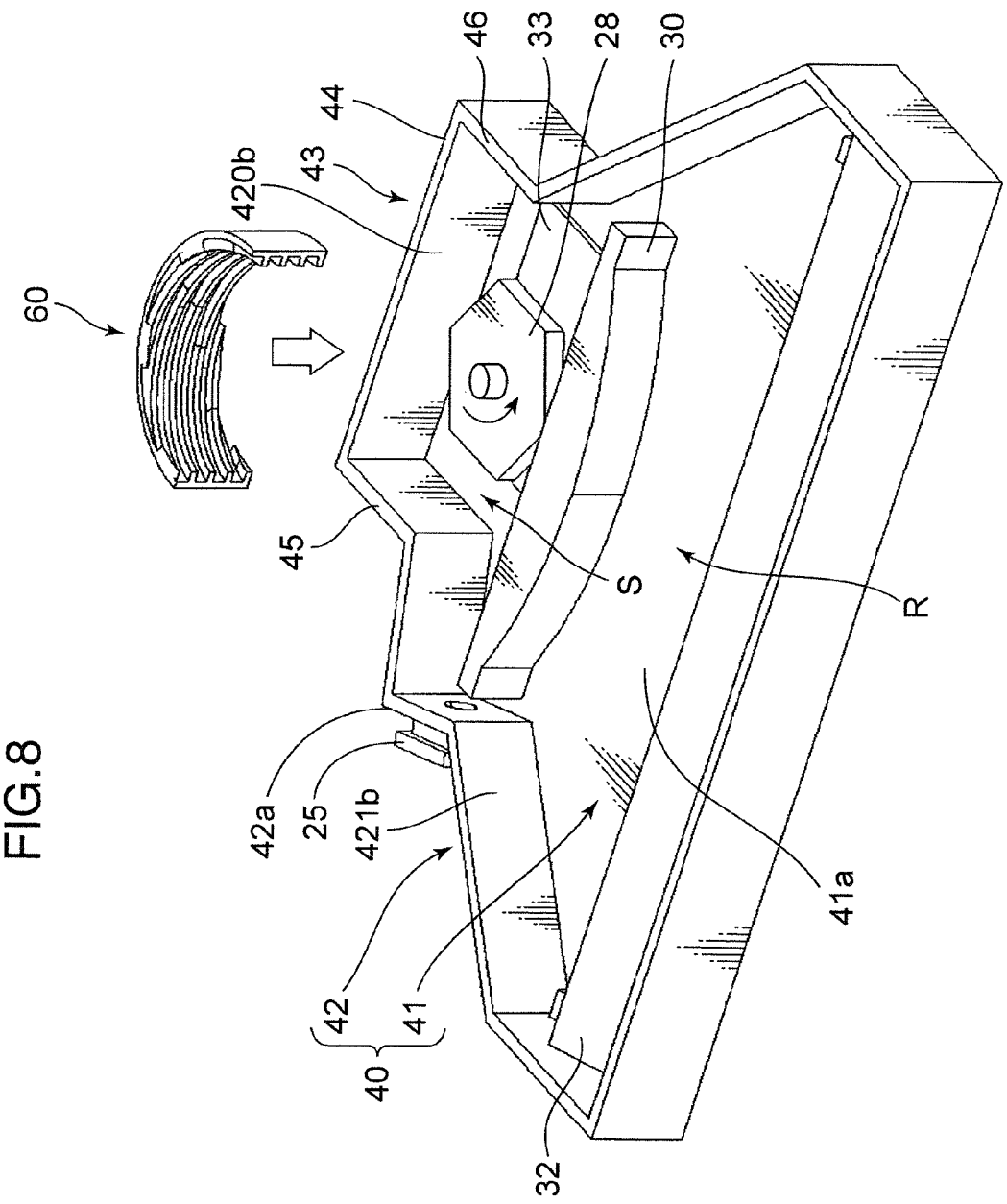
FIG. 8 is a perspective view of an exposure device as seen from obliquely above.
Figure 9:
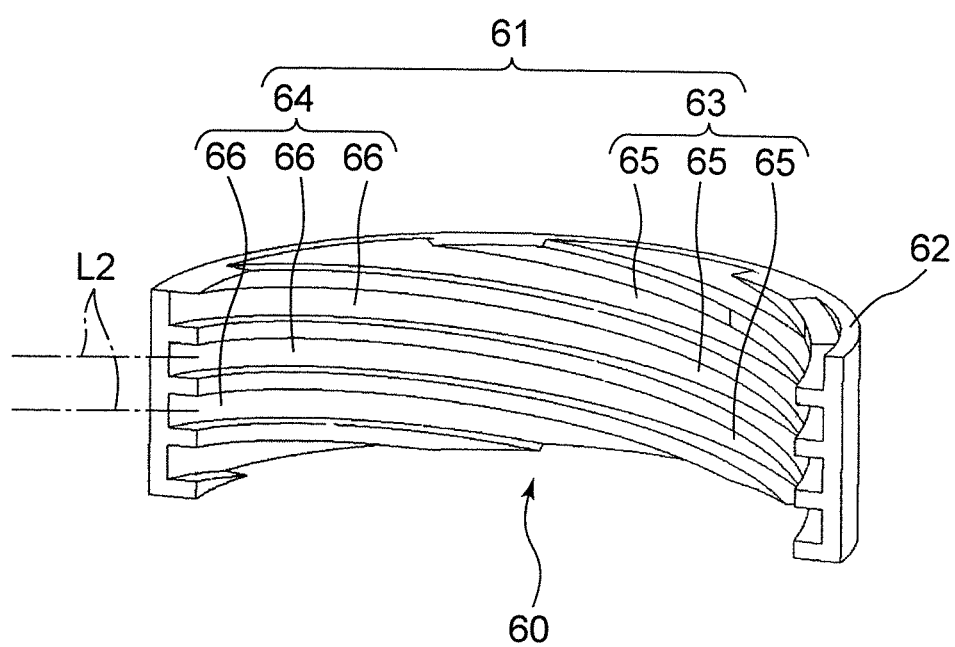
FIG. 9 is an enlarged perspective view of a flow-control member of an exposure device.
Figure 10:
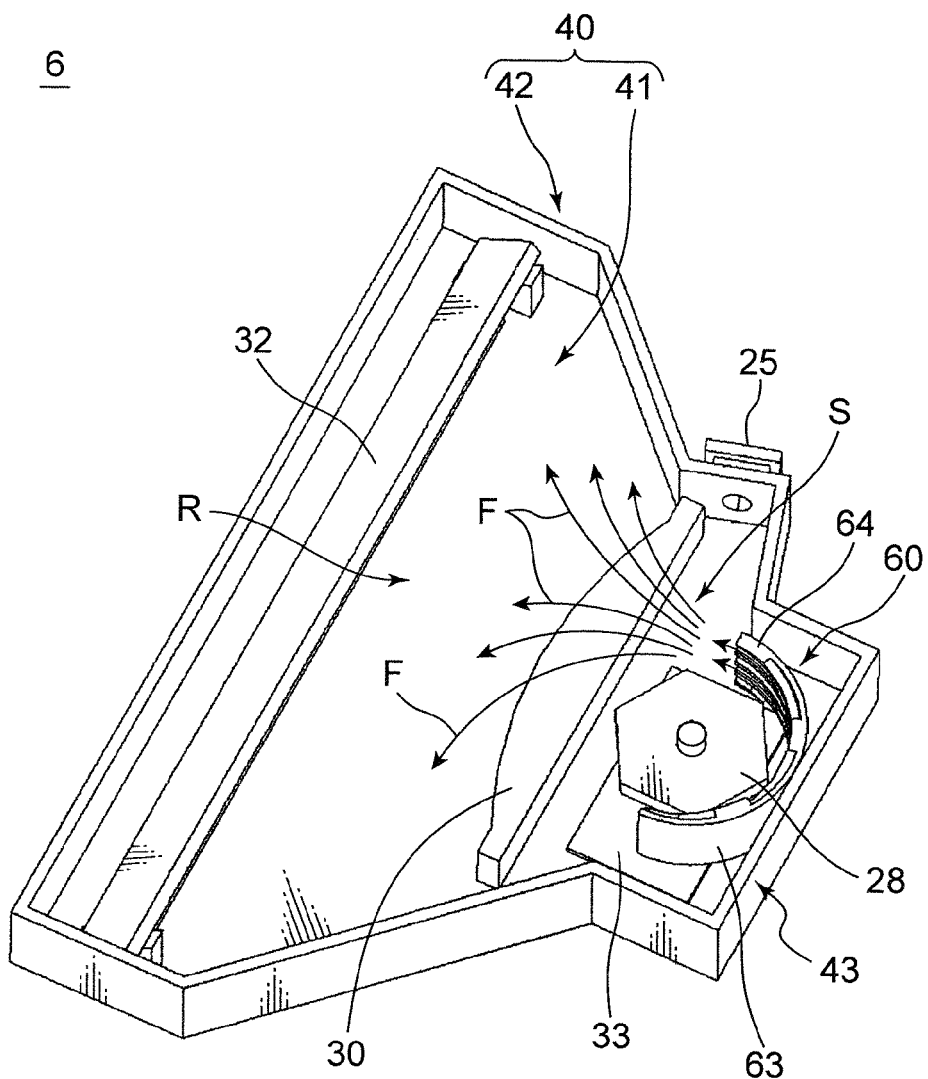
FIG. 10 is a perspective view of an exposure device illustrating a flow direction of airflow.

Next, the flow-control member 60 according to the second embodiment will be described with reference to FIGS. 8 to 10. FIG. 8 is a perspective view of the exposure device 6 as seen from obliquely above which illustrates a state before the flow-control member 60 is mounted to the exposure device 6. FIG. 9 is an enlarged perspective view of the flow-control member 60. FIG. 10 is a perspective view of the exposure device 6 as seen from obliquely above which illustrates a state where the flow-control member 60 is mounted to the exposure device 6.

Unlike the flow-control member 50 according to the first embodiment, the flow-control member 60 according to the second embodiment is a member separate from the housing 40. Specifically, the flow-control member 60 has a main body part 62 arranged between the polygon mirror 28 and the first inner wall surface 420b of the U-shaped part 43, and a groove part 61 integrally formed with the main body part 62.

The main body part 62 has a shape that surrounds the polygon mirror 28 along a rotational direction of the polygon mirror 28 and, in the present embodiment, is a semicircular member cut obtained by cutting a cylindrical member along an axial direction. In addition, the main body part 62 is arranged so as to oppose the opposing space R across the polygon mirror 28. Furthermore, the main body part 62 is mounted to the cover member 43 (FIG. 12) instead of to the bottom wall 41. The position where the main body part 62 is mounted to the cover member 43 is set such that when the cover member 43 is mounted to the side wall 42 and the arrangement space S is covered from above, the main body part 62 does not come into contact with the polygon mirror 28 or the control board 33.

The groove part 61 is formed on a surface opposing the polygon mirror 28 of the main body part 62, and has an upstream-side portion 63 positioned on an upstream-side with respect to a rotational direction of the polygon mirror 28 and a downstream-side portion 64 positioned on a downstream-side of the upstream-side portion 63. The upstream-side portion 63 includes a plurality of helical grooves 65 that inclines upward as the helical grooves 65 extend toward the downstream-side in the rotational direction of the polygon mirror 28. The downstream-side portion 64 similarly includes a plurality of helical grooves 66 that inclines upward as the helical grooves 66 extend toward the downstream-side in the rotational direction of the polygon mirror 28. The grooves 65 of the upstream-side portion 63 and the grooves 66 of the downstream-side portion 64 communicate with each other. Moreover, instead of being helically shaped, the grooves 65 of the upstream-side portion 63 may be configured as a plurality of grooves which extend in a circumferential direction of the main body part 62 and which are juxtaposed in an axial direction of the main body part 62.

In the second embodiment, the grooves 66 of the downstream-side portion 64 similarly extend at a predetermined angle with respect to a horizontal plane, and the direction in which the grooves 66 extend is set such that the fθ lens 30 is not positioned on a virtual extended line L2 defined by extending the grooves 66.

Figure 11:
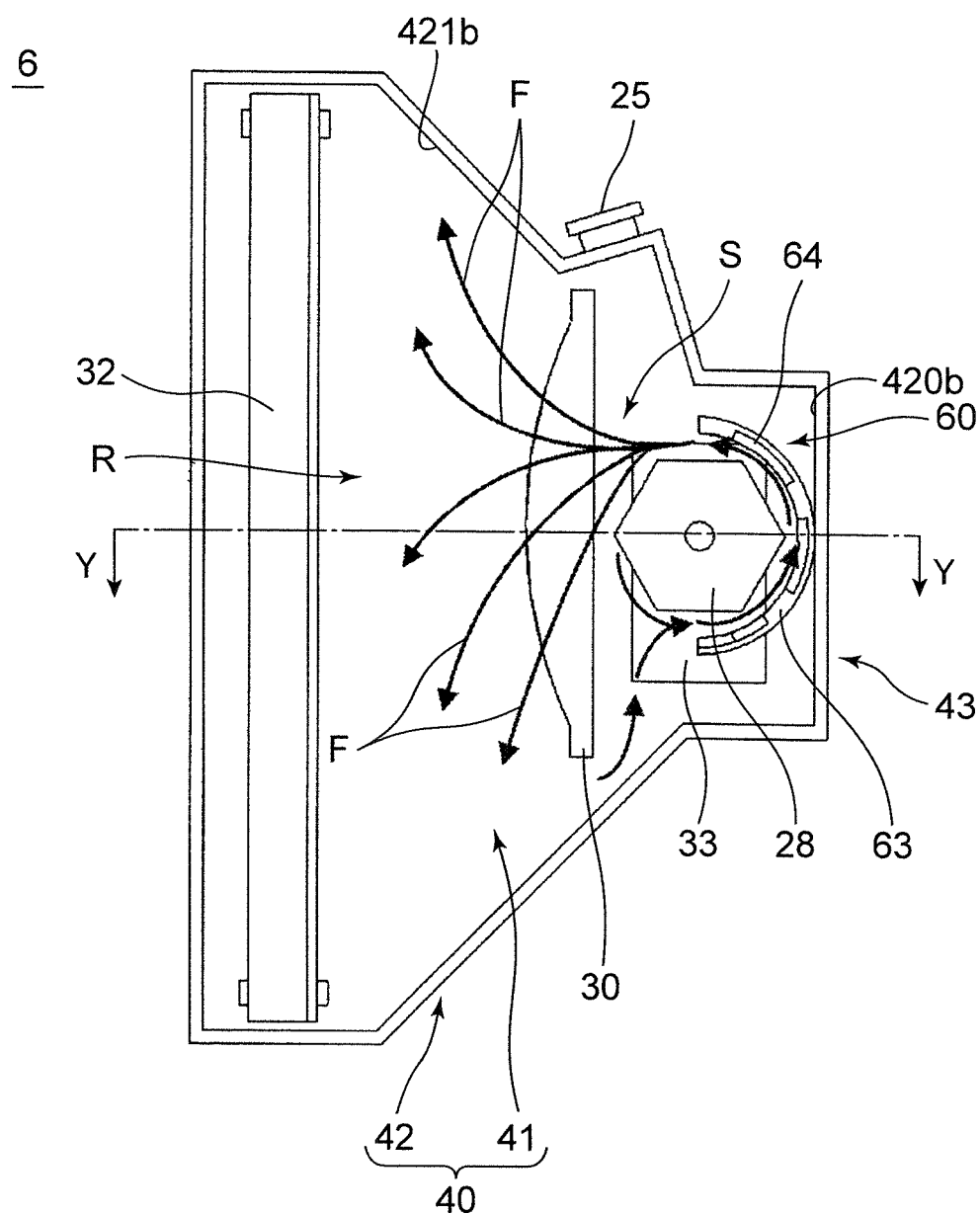
FIG. 11 is a plan view of an exposure device illustrating a flow direction of airflow.
Figure 12:
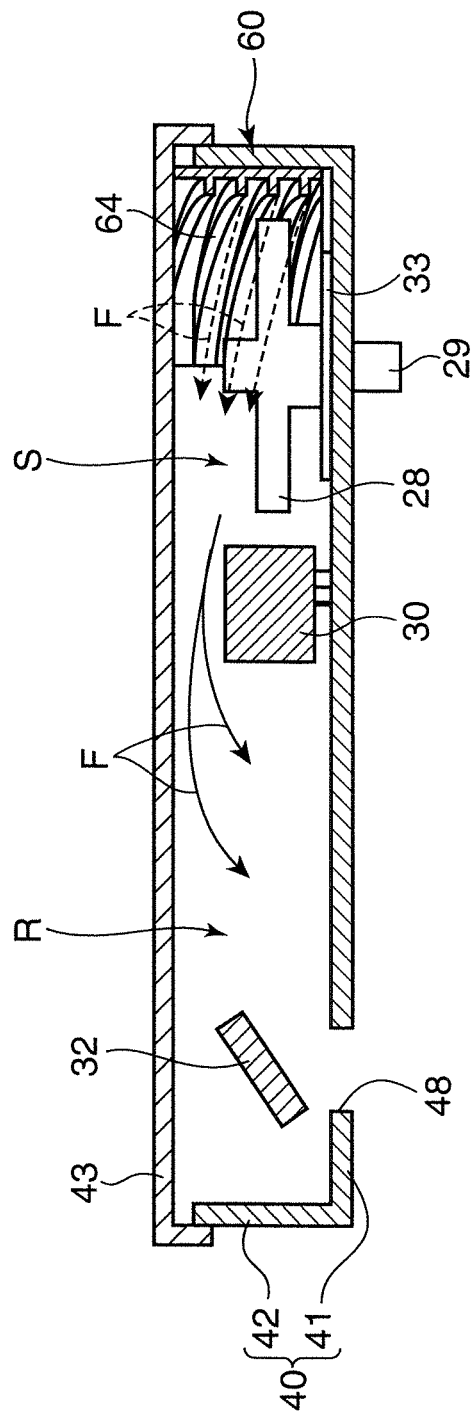
FIG. 12 is a cross-sectional view taken along line Y-Y in FIG. 11 and illustrates a flow direction of an airflow.

A flow direction of an airflow F generated by a rotation of the polygon mirror 28 is controlled by the flow-control member 60 as indicated by the arrows in FIG. 10 to FIG. 12. FIG. 10 illustrates a flow direction of the airflow F when the exposure device 6 is seen from obliquely above, FIG. 11 illustrates a flow direction of the airflow F when the exposure device 6 is seen from above, and FIG. 12 illustrates a flow direction of the airflow F when the exposure device 6 is seen along line Y-Y in FIG. 11.

The airflow F generated by a rotation of the polygon mirror 28 first passes through the grooves 65 of the upstream-side portion 63 to be guided to the grooves 66 of the downstream-side portion 64. Since the grooves 65 of the upstream-side portion 63 and the grooves 66 of the downstream-side portion 64 are helically formed, the airflow F passes through the grooves 65 and 66 while having the flow direction of the airflow F deflected in a helical direction. The airflow F deflected in a helical direction in this manner is guided from the arrangement space S to the opposing space R without being blocked by the first inner wall surface 420b of the U-shaped part 43 and by the fθ lens 30, passes above the fθ lens 30, and is circulated within the opposing space R. Circulation of the airflow F in the housing 40 causes the arrangement space S to enter a negative pressure state. Therefore, a part of the circulated airflow F is suctioned by, and returns into, the arrangement space S. As shown, due to the flow-control member 60, the airflow F can be circulated between the arrangement space S and the opposing space R.

Since the flow-control member 60 of the second embodiment described above is also capable of guiding the airflow F generated by a rotation of the polygon mirror 28 to the outside of the arrangement space S and circulating the airflow F within the housing 40, heat generated by the control board 33 is carried by the airflow F to the opposing space R to be cooled without being accumulated in the arrangement space S. Consequently, a nonuniform thermal deformation of the housing 40 can be suppressed. As a result, a favorable toner image can be formed on the photosensitive drum 4.

In addition, since the flow-control member 60 of the second embodiment is also arranged in the arrangement space S in which the polygon mirror 28 and the control board 33 are arranged, a space for arranging the flow-control member 60 need not be separately secured in the housing 40. Consequently, a contribution can be made to the downsizing of the housing 40 and, in turn, to the downsizing of the optical scanning device.

Furthermore, since the main body part 62 of the flow-control member 60 according to the second embodiment is a member separated from the housing 40, when it is difficult to form the groove part 51 on the housing 40 itself as is the case with the first embodiment such as when the groove part 51 cannot be integrally formed on the first inner wall surface 420b due to the shape of the housing 40, the airflow F can be reliably guided to the outside of the arrangement space S by forming the groove part 61 on the main body part 62. Even when configuring the main body part 62 as a member separate from the housing 40, an increase in the size of the housing 40 can be prevented since the main body part 62 is arranged inside the arrangement space S.

Moreover, since the main body part 62 of the flow-control member 60 according to the second embodiment is mounted to the cover member 43, the main body part 62 can be readily positioned with respect to the polygon mirror 28 and the control board 33 when the cover member 43 is mounted to the side wall 42 and the arrangement space S is covered from above. Consequently, a situation where the main body part 62 comes into contact with the polygon mirror 28 or the control board 33 and damages the polygon mirror 28 or the control board 33 can be suppressed.

Furthermore, with the flow-control member 60 according to the second embodiment, since the direction in which the downstream-side portion 64 of the groove part 61 extends is similarly set such that the fθ lens 30 is not positioned on a virtual extension line L2 defined by extending the downstream-side portion 64, an airflow F deflected by the downstream-side portion 64 is guided from the arrangement space S to the opposing space R without being blocked by the fθ lens 30. Consequently, in addition to suppressing accumulation of the airflow F in the arrangement space S due to blocking of the airflow F by the fθ lens 30, deterioration of an optical characteristic of the fθ lens 30 due to heat generated by the control board 33 can also be suppressed.

While the flow-control member 50 according to the first embodiment and the flow-control member 60 according to the second embodiment described above are configured so as to cause a deflected airflow F to pass above the fθ lens 30, such a configuration is not restrictive. When a housing 40 is adopted in which a space is available not above but below the fθ lens 30, a configuration that causes a deflected airflow F to pass below the fθ lens 30 may be adopted. In the case of the flow-control member 50 according to the first embodiment, the grooves 55 of the downstream-side portion 53 of the groove part 51 are to be extended obliquely downward. In addition, in the case of the flow-control member 60 according to the second embodiment, the grooves 66 of the downstream-side portion 64 of the groove part 61 are to be configured as helical grooves that incline downward as the helical grooves extend toward the downstream-side in the rotational direction of the polygon mirror 28.

The image forming apparatus and, more particularly, the optical scanning device (exposure device 6) that is used in the image forming apparatus according to the present embodiment described above are preferably configured as described below.

An optical scanning device according to the present embodiment includes a housing having a wall part and an arrangement space defined by a first inner wall surface in a part of the wall part, a laser light source outputting a laser light, a polygon mirror arranged in the arrangement space and deflecting the laser light to scan a predetermined object with the laser light while rotating, a polygon motor rotating the polygon mirror, a control board controlling the polygon motor, and a flow-control member arranged in the arrangement space and guiding an airflow generated by a rotation of the polygon mirror to an outside of the arrangement space to circulate the airflow within the housing.

With the optical scanning device according to the present embodiment, since an airflow generated by a rotation of the polygon mirror is guided by the flow-control member to the outside of the arrangement space and circulated within the housing, heat generated by the control board is not accumulated in the arrangement space and is instead carried to outside of the arrangement space by the airflow and cooled in a space other than the arrangement space in the housing. Therefore, an uneven temperature distribution can be suppressed from occurring in the housing. Consequently, a nonuniform thermal deformation of the housing can be suppressed. Moreover, since the flow-control member is arranged inside the arrangement space in which the polygon mirror and the control board are arranged, a space for arranging the flow-control member need not be separately secured in the housing. Consequently, a contribution can be made to the downsizing of the housing and, in turn, to the downsizing of the optical scanning device.

In the optical scanning device configured as described above, preferably, the flow-control member has a groove part capable of distributing the airflow, and the groove part extends in a direction that allows the airflow to be guided to the outside of the arrangement space.

According to the configuration described above, by simply forming a groove part, the airflow can be guided to the outside of the arrangement space and, in turn, nonuniform thermal deformation of the housing can be suppressed.

In the optical scanning device configured as described above, preferably, the groove part is integrally formed on the inner wall surface.

According to the configuration described above, since the flow-control member is integrally formed with the housing, a contribution may readily be made to the downsizing of the optical scanning device.

In the optical scanning device configured as described above, preferably, the flow-control member has a main body part that is arranged between the polygon mirror and the first inner wall surface so as to surround the polygon mirror along a rotational direction of the polygon mirror, and the groove part is formed on the main body part.

According to the configuration described above, while the main body part of the flow-control member is a member separated from the housing, when it is difficult to form the groove part on the housing itself such as when the groove part cannot be integrally formed on the inner wall surface due to the shape of the housing, the airflow can be reliably guided to the outside of the arrangement space by forming the groove part on the main body part. Moreover, even when configuring the main body part as a member separate from the housing, an increase in the size of the housing can be prevented since the main body part is arranged inside the arrangement space.

In the optical scanning device configured as described above, preferably, the housing includes a cover member that covers the arrangement space from above, and the main body part is mounted on the cover member.

According to the configuration described above, since the main body part is mounted on the cover member, the main body part can be readily positioned with respect to the polygon mirror and the control board when the arrangement space is covered by the cover member. Consequently, a situation where the main body part comes into contact with the polygon mirror or the control board and damages the polygon mirror or the control board can be suppressed.

In the optical scanning device configured as described above, preferably, the optical scanning device further includes an optical element arranged in the vicinity of the arrangement space in the housing and guiding the laser light, deflected by the polygon mirror, to the predetermined object. The groove part has a downstream-side portion that is positioned on a downstream-side with respect to a rotational direction of the polygon mirror and that extends in the direction that allows the airflow to be guided to the outside of the arrangement space, and the extending direction of the downstream-side portion is set such that the optical element is not positioned on a virtual extension line defined by extending the downstream-side portion.

According to the configuration described above, since the direction in which the downstream-side portion of the groove part extends is set such that the optical system element is not positioned on a virtual extension line defined by extending the downstream-side portion, the airflow passing the downstream-side portion is guided to the outside of the arrangement space without being blocked by the optical system element. Consequently, accumulation of the airflow in the arrangement space due to blocking of the airflow by the optical system element can be suppressed.

This application is based on Japanese Patent application serial No. 2010-016506 filed in Japan Patent Office on Jan. 28, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical scanning device comprising:
    a housing having a bottom wall and a wall part that rises from the bottom wall and an arrangement space defined by a first inner wall surface in a part of the wall part;
    a laser light source outputting a laser light;
    a polygon mirror arranged on the bottom wall in the arrangement space and deflecting the laser light to scan a predetermined object with the laser light while rotating;
    an elongated optical element fixed to the bottom wall so as to extend in a predetermined direction in the housing and guiding the laser light deflected by the polygon mirror to the predetermined object;
    a polygon motor rotating the polygon mirror;
    a control board fixed on the bottom wall below the polygon mirror and configured to control the polygon motor; and
    a flow-control member arranged in the arrangement space and guiding an airflow generated by a rotation of the polygon mirror to an outside of the arrangement space to circulate the airflow within the housing, wherein
    the flow-control member includes:
    a main body part that is arranged between the polygon mirror and the first inner wall surface so as to surround the polygon mirror along a rotational direction of the polygon mirror; and
    a groove part formed on the main body part and capable of guiding the airflow, the groove part extending in a direction that allows the airflow to be guided to the outside of the arrangement space,
    the housing includes a cover member that is attached to an upper edge of the wall part and covers the arrangement space from above, and
    the main body part of the flow-control member is integrated with the cover member,
    the first inner wall surface is formed in an approximately U-shape as seen from above,
    the optical element partitions the housing into the arrangement space and an opposing space facing the arrangement space, the arrangement space being defined between the optical element and the first inner wall surface,
    a first gap is defined between both longitudinal ends of the optical element and the wall part,
    a second gap defined above the optical element and providing communication between the opposing space and the arrangement space and between the optical element and the cover member,
    the groove part of the flow control member is configured so that airflow is guided to the opposing space through the second gap and returns into the arrangement space through the first gap so that the airflow is circulated between the arrangement space and the opposing space.

2. The optical scanning device according to claim 1, wherein
    the main body part is arranged opposing the control board vertically and does not come into contact with the control board when in the cover member is mounted to the wall part.

3. The optical scanning device according to claim 2, wherein the groove part is a helical groove part extending, with respect to the rotational direction of the polygon mirror, from an upstream-side to a downstream-side in the rotational direction.

4. The optical scanning device according to claim 1, wherein
    the main body of the flow-control member is an integral semicircular arc-shaped object having a concave side facing the optical element.

5. The optical scanning device according to claim 1, wherein
    the groove part comprises plural grooves that incline upward from the upstream side toward the downstream side in the rotational direction and juxtaposed in an axial direction of the main body part.

6. An image forming apparatus comprising:
    a photosensitive drum on which an electrostatic latent image is formed;
    an optical scanning device exposing the photosensitive drum based on image information to form the electrostatic latent image; and
    a developing device developing the electrostatic latent image to form a toner image on the photosensitive drum, wherein
    the optical scanning device includes:
    a housing having a bottom wall and a wall part that rises from the bottom wall and an arrangement space defined by a first inner wall surface in a part of the wall part;
    a laser light source outputting a laser light;
    a polygon mirror arranged on the bottom wall in the arrangement space and deflecting the laser light to scan a predetermined object with the laser light while rotating;
    a polygon motor rotating the polygon mirror;
    an elongated optical element fixed to the bottom wall so as to extend in a predetermined direction in the housing and guiding the laser light deflected by the polygon mirror to the predetermined object;
    a control board fixed on the bottom wall below the polygon mirror and configured to control the polygon motor; and
    a flow-control member arranged in the arrangement space and guiding an airflow generated by a rotation of the polygon mirror to an outside of the arrangement space to circulate the airflow within the housing, wherein
    the flow-control member includes:
    a main body part that is arranged between the polygon mirror and the first inner wall surface so as to surround the polygon mirror along a rotational direction of the polygon mirror; and a groove part that is formed on the main body part and capable of guiding the airflow, the groove part extending in a direction that allows the airflow to be guided to the outside of the arrangement space,
    the housing includes a cover member that is attached to an upper edge of the wall part and covers the arrangement space from above, and
    the main body part of the flow-control member is integrated with the cover member the first inner wall surface is formed in an approximately U-shape as seen from above, the optical element partitions the housing into the arrangement space and an opposing space facing the arrangement space, the arrangement space being defined between the optical element and the first inner wall surface, a first gap is defined between both longitudinal ends of the optical element and the wall part, a second gap defined above the optical element and providing communication between the opposing space and the arrangement space and between the optical element and the cover member, the groove part of the flow control member is configured so that airflow is guided to the opposing space through the second gap and returns into the arrangement space through the first gap so that the airflow is circulated between the arrangement space and the opposing space.

7. The image forming apparatus according to claim 6, wherein the main body part is arranged opposing the control board vertically and does not come into contact with the control board when in the cover member is mounted to the wall part.

8. The image forming apparatus according to claim 7, wherein the groove part is a helical groove part extending, with respect to the rotational direction of the polygon mirror, from an upstream-side to a downstream-side in the rotational direction.

9. The optical scanning device according to claim 6, wherein the main body of the flow-control member is an integral semicircular arc-shaped object having a concave side facing the optical element.

10. The optical scanning device according to claim 6, wherein the groove part comprises plural grooves that incline upward from the upstream side toward the downstream side in the rotational direction and juxtaposed in an axial direction of the main body part.

11. An optical scanning device comprising:

a housing having a bottom wall and a wall part that rises from the bottom wall and an arrangement space defined by a first inner wall surface in a part of the wall part;

a laser light source outputting a laser light;

a polygon mirror arranged on the bottom wall in the arrangement space and deflecting the laser light to scan a predetermined object with the laser light while rotating;

an elongated optical element fixed to the bottom wall so as to extend in a predetermined direction in the housing and guiding the laser light deflected by the polygon mirror to the predetermined object;

a polygon motor rotating the polygon mirror;

a control board arranged on the bottom wall below the polygon mirror and configured to control the polygon motor;

a cover attached to an upper edge of the wall part of the housing opposite the bottom wall and covering the arrangement space from above; and a flow-control member attached to the cover and projecting into the arrangement space, the flow-control member including a main body disposed inward of the first inner wall surface and spaced outward of the polygon mirror so as to surround at least part of the polygon mirror along a rotational direction of the polygon mirror, a groove being formed on a surface of the main body facing the polygon mirror and being configured for guiding an airflow generated by a rotation of the polygon mirror to an outside of the arrangement space to circulate the airflow within the housing, the main body being opposed to and spaced vertically from the control board the first inner wall surface is formed in an approximately U-shape as seen from above, the optical element partitions the housing into the arrangement space and an opposing space facing the arrangement space, the arrangement space being defined between the optical element and the first inner wall surface, a first gap is defined between both longitudinal ends of the optical element and the wall part, a second gap defined above the optical element and providing communication between the opposing space and the arrangement space and between the optical element and the cover member, the groove part of the flow control member is configured so that airflow is guided to the opposing space through the second gap and returns into the arrangement space through the first gap so that the airflow is circulated between the arrangement space and the opposing space.

12. The optical scanning device according to claim 11, wherein the cover has a peripheral wall telescoped with the wall part of the housing when the cover is attached to an upper edge of the wall part of the housing, the peripheral wall of the cover and the main body of the flow-control member being disposed to maintain the main body spaced from the polygon mirror and the control board when the cover is mounted on the housing.

13. The optical scanning device according to claim 11, wherein the groove part is a helical groove part extending, with respect to the rotational direction of the polygon mirror, from an upstream-side to a downstream-side in the rotational direction.

14. The optical scanning device according to claim 11, wherein the main body of the flow-control member is an integral semicircular arc-shaped object having a concave side facing the optical element.

15. The optical scanning device according to claim 11, wherein the groove part comprises plural grooves that incline upward from the upstream side toward the downstream side in the rotational direction and juxtaposed in an axial direction of the main body part.

* * * * *